US012607806B2

(12) United States Patent
Poe et al.

(10) Patent No.: US 12,607,806 B2
(45) Date of Patent: Apr. 21, 2026

(54) SLIDABLE FIBER OPTIC ADAPTOR IN OPTIC FIBER PANEL ASSEMBLY

(71) Applicant: Google LLC, Mountain View, CA (US)

(72) Inventors: Charles Poe, Palo Alto, CA (US); Jose Nazario, Ashburn, VA (US)

(73) Assignee: Google LLC, Mountain View, CA (US)

( * ) Notice: Subject to any disclaimer, the term of this patent is extended or adjusted under 35 U.S.C. 154(b) by 685 days.

(21) Appl. No.: 17/876,721

(22) Filed: Jul. 29, 2022

(65) Prior Publication Data

US 2023/0384529 A1    Nov. 30, 2023

Related U.S. Application Data

(60) Provisional application No. 63/345,960, filed on May 26, 2022.

(51) Int. Cl.
G02B 6/38 (2006.01)
G02B 6/44 (2006.01)

(52) U.S. Cl.
CPC ......... G02B 6/3825 (2013.01); G02B 6/3893 (2013.01); G02B 6/4452 (2013.01)

(58) Field of Classification Search
CPC .. G02B 6/3825; G02B 6/3893; G02B 6/4452; G02B 6/3897; G02B 6/38
See application file for complete search history.

(56) References Cited

U.S. PATENT DOCUMENTS

| | | | |
|---|---|---|---|
| 5,142,597 A | 8/1992 | Mulholland et al. | |
| 5,647,043 A | 7/1997 | Anderson et al. | |
| 5,687,268 A | 11/1997 | Stephenson et al. | |
| 6,364,537 B1 | 4/2002 | Maynard | |
| 7,418,184 B1 | 8/2008 | Gonzales et al. | |
| 8,452,148 B2 | 5/2013 | Cooke et al. | |
| 8,676,022 B2 | 3/2014 | Jones | |
| 8,747,150 B1 | 6/2014 | Lin | |
| 9,128,255 B2 | 9/2015 | Sato | |

(Continued)

FOREIGN PATENT DOCUMENTS

| | | |
|---|---|---|
| CN | 101820121 A | 9/2010 |
| CN | 104081241 A | 10/2014 |

(Continued)

OTHER PUBLICATIONS

Extended European Search Report for European Patent Application No. 22209450.0 dated May 30, 2023. 10 pages.

(Continued)

*Primary Examiner* — Jennifer Doan
(74) *Attorney, Agent, or Firm* — Lerner David LLP

(57) ABSTRACT

A slidable fiber optic adaptor slidable relative to a mounting support configured to be mounted to a fiber optic tray in a panel assembly is provided for fiber optic interconnection. The slidable adaptor may be slidable between a non-extended position and an extended position. Thus, when the fiber optic connectors having different polarities are connected to the slidable adaptors, the slidable fiber optic adaptor may be pulled out in the extended position to allow the fiber optic connectors with different polarities to be in a staggered configuration, thus, providing sufficient space therebetween for finger access for operators or technicians for ease of cable inspection and management.

19 Claims, 12 Drawing Sheets

(56) References Cited

U.S. PATENT DOCUMENTS

| | | | |
|---|---|---|---|
| 9,268,103 | B2 | 2/2016 | Nguyen et al. |
| 9,429,251 | B1 | 8/2016 | Lin |
| 9,465,172 | B2 | 10/2016 | Shih |
| 9,625,658 | B1 | 4/2017 | Lin |
| 10,228,516 | B2 | 3/2019 | Veatch et al. |
| 10,379,298 | B2 * | 8/2019 | Dannoux ............. G02B 6/3851 |
| 10,502,920 | B2 * | 12/2019 | Coenegracht ........ G02B 6/4472 |
| 10,564,378 | B2 | 2/2020 | Cooke et al. |
| 10,871,619 | B2 | 12/2020 | Ninomiya et al. |
| 2001/0026661 | A1 | 10/2001 | de Jong et al. |
| 2009/0245743 | A1 | 10/2009 | Cote et al. |
| 2010/0032276 | A1 | 2/2010 | Arai |
| 2010/0278498 | A1 | 11/2010 | Zimmel |
| 2011/0267794 | A1 | 11/2011 | Anderson et al. |
| 2013/0108231 | A1 | 5/2013 | Mertesdorf |
| 2013/0183018 | A1 | 7/2013 | Holmberg |
| 2014/0003782 | A1 | 1/2014 | Blackwell, Jr. et al. |
| 2014/0003783 | A1 | 1/2014 | Smrha et al. |
| 2014/0226946 | A1 | 8/2014 | Cooke et al. |
| 2014/0334780 | A1 | 11/2014 | Nguyen et al. |
| 2015/0078710 | A1 | 3/2015 | Sato |
| 2015/0293311 | A1 | 10/2015 | Coffey et al. |
| 2016/0327768 | A1 | 11/2016 | Xu et al. |
| 2017/0010432 | A1 | 1/2017 | Xu et al. |
| 2017/0205586 | A1 | 7/2017 | Chang et al. |
| 2017/0248762 | A1 | 8/2017 | Sato |
| 2018/0217338 | A1 | 8/2018 | Takano et al. |
| 2019/0243083 | A1 | 8/2019 | Ninomiya et al. |
| 2019/0271816 | A1 | 9/2019 | Wong et al. |
| 2019/0339465 | A1 | 11/2019 | Murray et al. |
| 2020/0249410 | A1 | 8/2020 | Smrha et al. |
| 2020/0386967 | A1 | 12/2020 | Ninomiya et al. |

FOREIGN PATENT DOCUMENTS

| | | |
|---|---|---|
| CN | 203981920 U | 12/2014 |
| CN | 106980157 A | 7/2017 |
| EP | 2783247 A2 | 10/2014 |
| TW | M487444 U | 10/2014 |
| WO | 2013109469 A1 | 7/2013 |

OTHER PUBLICATIONS

Extended European Search Report for European Patent Application No. 20210632.4 dated May 4, 2021. 9 pages.
Extended European Search Report for European Patent Application No. 20211893.1 dated Aug. 2, 2021. 10 pages.
Office Action for Chinese Patent Application No. 202011056877.4 dated Oct. 19, 2021. 12 pages.
Partial European Search Report for European Patent Application No. 20211893.1 dated Apr. 30, 2021. 11 pages.
Reference number list for U.S. Patent Application Publication No. 2019/0243083 of Ninomiya et al. (Ninomiya) (Year: 2021).
Reference number list for U.S. Appl. No. 16/893,721 of Poe et al. (Poe, the present application) (Year: 2021).
Reference number list for U.S. Pat. No. 6,364,537 of Maynard (Maynard) (Year: 2021).
Office Action for Chinese Patent Application No. 202211502097.7 dated Jul. 10, 2025. 9 pages.

* cited by examiner

SLIDABLE FIBER OPTIC ADAPTOR IN OPTIC FIBER PANEL ASSEMBLY

CROSS-REFERENCE TO RELATED APPLICATIONS

The present application claims the benefit of the filing date of U.S. Provisional Patent Application No. 63/345,960, filed May 26, 2022, the disclosure of which is hereby incorporated herein by reference.

BACKGROUND

The capabilities of fiber optic connectors, fiber optic cable and fiber optic hardware have been continuously advanced to meet the demands of increasing numbers of users and high transmission rate requirements. Fiber optic hardware is increasingly being used for a variety of applications, such as data transmission, video, broadband voice and the like. The fiber optic cable, connectors or electrical cables are connected to a fiber optic adaptor mounted in a panel assembly disposed in a cable management rack located in a data distribution center or a server room. The fiber optic adaptor provides cable-to-cable fiber optic connections and manages the polarity of fiber optic cable connections. The fiber optic adaptor is mounted to a tray that may be further mounted to the panel assembly. The tray may be extended from the panel assembly like a drawer to allow technicians or operators to access to the fiber optic components, connectors, or fiber optic cables connected to the fiber optic adaptor without removing the fiber optic module from the panel assembly.

While a higher density connection with an increased number of fiber optic components and connectors in the fiber optic adaptor would help to satisfy increased demand, such higher density connections make it difficult to access the fiber optic components and connectors connected in the fiber optic adaptor. Conventional tray pull-out configurations often have cramped spaces among the fiber optic connectors coupled to the fiber optic adaptor, resulting in difficult finger access for the operators to remove or arrange the fiber optic connectors in the fiber optic adaptor which is further mounted in the panel assembly.

BRIEF SUMMARY

A fiber optic panel assembly is provided that includes a fiber optic adaptor that may be slidable relative to a mounting support configured to be mounted to a fiber optic panel assembly. The fiber optic adaptor disposed in the mounting support may be slidable between extended and non-extended positions to facilitate finger access of the fiber optic connectors coupled to the fiber optic adaptor. The extended position of the fiber optic adaptor relative to the mounting support may provide sufficient spaces among the fiber optic connectors for easy finger access by operators, while maximizing the number of the fiber optic connectors in the fiber optic panel assembly. In one example, a fiber optic adaptor includes a housing including a first portion and a second portion, wherein the first portion extends from the second portion. A plurality of connecting ports is defined in the second portion of the housing. A sliding feature is disposed around an outer surface of the first portion.

In one example, the sliding feature is a rectangular ring at least partially circumscribing an outer perimeter of the first portion. The sliding feature is configured to allow a sliding movement of the fiber optic adaptor relative to a mounting support when the fiber optic adaptor is coupled to the mounting support. The mounting support is configured to be mounted to a fiber optic panel assembly for fiber cable connection.

In one example, the sliding feature includes sidewalls extending along opposing sides of the sliding feature and one or more sloped plates formed on each sidewall of the sliding feature. In one example, a first securing rod is formed on one of the sidewalls of the sliding feature. A stopper is formed at an end surface of the first portion of the fiber optic adaptor. The stopper is configured to be engaged with a post of a mounting support when the fiber optic adaptor is coupled to the mounting support and pulled in an extended position.

In one example, a plurality of engagement features is formed on the second portion of the fiber optic adaptor, the engagement features configured to engage with the post of the mounting support when the fiber optic adaptor is coupled to the mounting support and maintained in a non-extended position. The connecting ports are configured to receive dual polarity fiber optic connectors.

Another aspect of the disclosure provides a fiber optic panel assembly including a mounting support disposed in a slidable tray disposed in a fiber optic panel assembly and a slidable fiber optic adaptor disposed in the mounting support, wherein the slidable fiber optic adaptor is slidable relative to the mounting support between an extended position and a non-extended position.

In one example, the fiber optic adaptor includes a housing including a first portion connected to a second portion. A plurality of connecting ports is defined in the second portion of the housing. A sliding feature is disposed around a perimeter of the first portion.

In one example, the connecting ports are configured to receive dual polarity fiber optic connectors. The slidable fiber optic adaptor has an end substantially coplanar with an inner surface of the mounting support when the slidable fiber optic adaptor is in the non-extended position. The slidable fiber optic adaptor has an end caved inward from an inner surface of the mounting support when the slidable fiber optic adaptor is in the extended position.

In one example, the slidable fiber optic adaptor has a stopper configured to engage with a post of the mounting support when the slidable fiber optic adaptor is in the extended position. The slidable fiber optic adaptor has a plurality of engagement features configured to engage with the post of the mounting support when the slidable fiber optic adaptor is in the non-extended position.

In one example, the slidable fiber optic adaptor has one or more sloped plates formed on sidewalls of the slidable fiber optic adaptor, the sloped plates configured to go through from a compressed state to an expanded state when switching from the non-extended position to the extended position. A securing rod is formed on a sidewall of the slidable fiber optic adaptor configured to engage with a channel formed in the mounting support.

Another aspect of the disclosure provides a fiber optic panel assembly including a ceiling cover, a bottom cover, and two opposing side panels defining an interior opening therein. A plurality of slidable fiber optic adaptors is disposed in a mounting support disposed in the fiber optic panel assembly, wherein each of the slidable fiber optic adaptors is individually slidable between an extended position and a non-extended position.

DETAILED DESCRIPTION

This disclosure provides a fiber optic adaptor slidable relative to a mounting support configured to be mounted to a fiber optic tray in a panel assembly for fiber optic interconnection. The fiber optic adaptor may be slidable between a non-extended position and an extended position that allow the fiber optic connectors connected to the fiber optic adaptors with relatively wider space when the fiber optic adaptor is slid to the extended position. The relatively wider space among the fiber optic connectors may provide sufficient spaces among the fiber optic connectors that allow finger access for operators or technicians. Thus, the operators or technicians can access the fiber optic connectors with ease and reduced interference from the adjacent fiber optic connectors. The fiber optic adaptor may receive and accommodate fiber optic connectors with different polarities while maintaining sufficient space among the fiber optic connectors for inspection and connection management. Furthermore, by utilizing the slidable fiber optic adaptor in the fiber optic panel assembly, multiple fiber optic connectors with different polarities may be placed in a closely packed arrangement, thus efficiently utilizing the space in the fiber optic panel assembly to enhance the capacity of the adaptors that may be carried in the panel assembly. The slidable fiber optic adaptor may be individually pulled out to the extended position for ease of management of a target fiber optic connector coupled to the fiber optic tray for cable inspection and management.

Figure 1A:
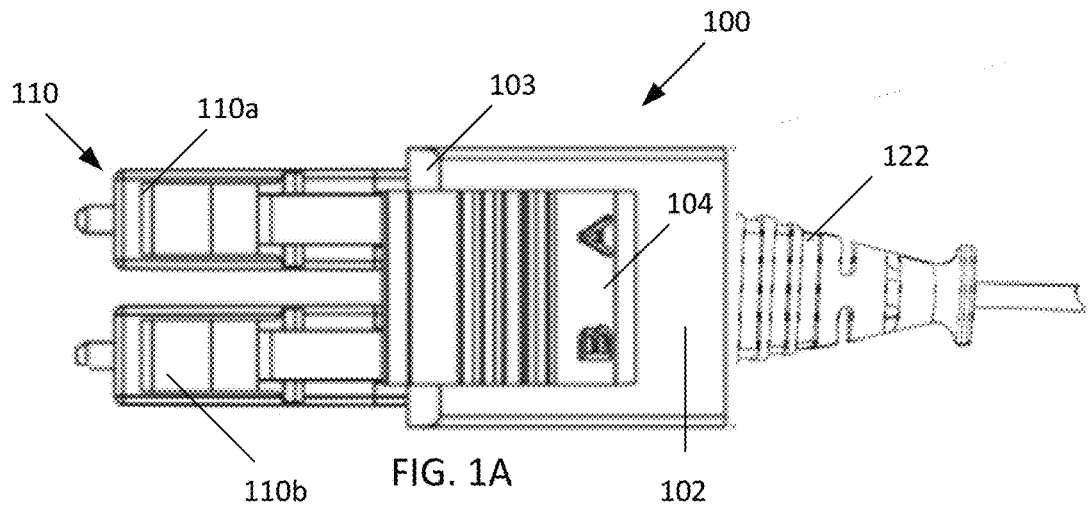
FIGS. 1A-1C depict an example of a fiber optic connector according to aspects of the disclosure.
Figure 1B:
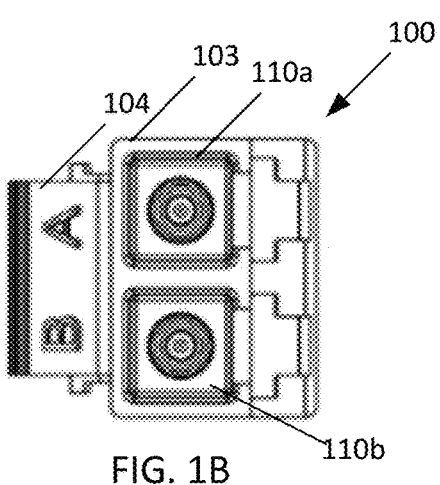
Figure 1C:
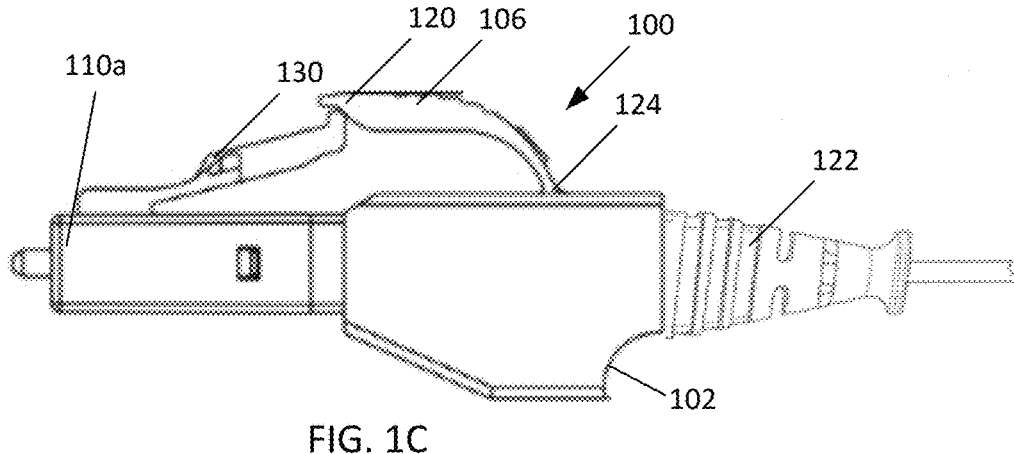

FIGS. 1A-1C depict an example of a fiber optic connector 100 that provides dual polarity configurations. FIG. 1A depicts a top view of the fiber optic connector 100. The fiber optic connector 100 comprises a body 102 that has two connector assemblies 110 (shown as 110a, 110b) connected thereto.

FIG. 1B depicts a front view of the fiber optic connector 100 illustrating the two connector assemblies 110 (shown as 110a, 110b) formed at a front section 103 of the fiber optic connector 100. Connector polarity indicia 104 is formed in the body 102 that indicates the polarity of the connector 100. The body 102 encases two optic fibers connecting to the two connector assemblies 110a, 110b respectively. The two optic fibers enclosed in the body 102 are connected to a cable 122 connected to the body 102.

FIG. 1C depicts a side view of the fiber optic connector 100. A latch 106 has a first end 120 connected to the connector assemblies 110a, 110b through a spring latch arm 130 and a second end 124 connected to the body 102. The latch 106 is used to secure the fiber optic connector 100 to an adaptor. The spring latch arm 130 releasably engages the latch 106. The spring latch arm 130 may be pressed to disengage from the latch 106. When the spring latch arm 130 is released and disengaged from the latch 106, the connector assemblies 110a, 110b may be inserted into an adapter in a predetermined insertion direction. The adaptor may be disposed in a fiber optic panel assembly 300 that may be mounted in a fiber management system. The latch 106 abuts against the spring latch arm 130 connected to the connector assemblies 110a, 110b. When the latch 160 is pressed, it pushes the spring latch arm 130in a downward direction. Such movement may cause the connector assembly 110a, 110b to disengage from the adapter, such that the connector assembly 110a, 110b can be removed out of the port. When a reversal of the polarity configuration is desired, the spring latch arm 130 may be pressed to discharge the connector assemblies 110a, 110b from the body 102. The connector assemblies 110a, 110b may then be flipped and rotated for 180 degrees for polarity reversal and the latch 106 will then be re-attached to the opposite site of the body 102. Details of the adaptor that may be utilized to mate with the fiber optic connector 100 with dual polarity is illustrated below in detail with reference to FIGS. 2A-2B. While in this example operation of the latch 160 can cause disengagement of two connector assemblies 110a, 110b, it should be understood that in other examples the latch can be configured to cause disengagement of additional or fewer connector assemblies. For example, each connector assembly 110a, 110b may be disengaged by operation of a corresponding one of two separate latches.

Figure 2:
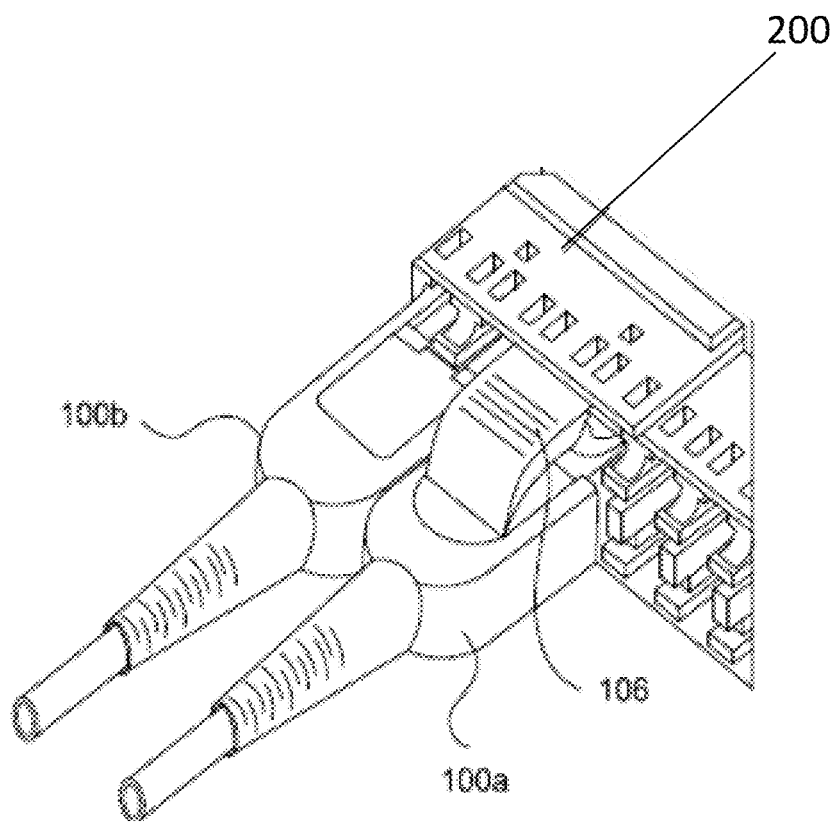
FIG. 2 depicts an example of fiber optic connectors with different polarity configurations connected to a slidable fiber optic adaptor according to aspects of the disclosure.
Figure 3:
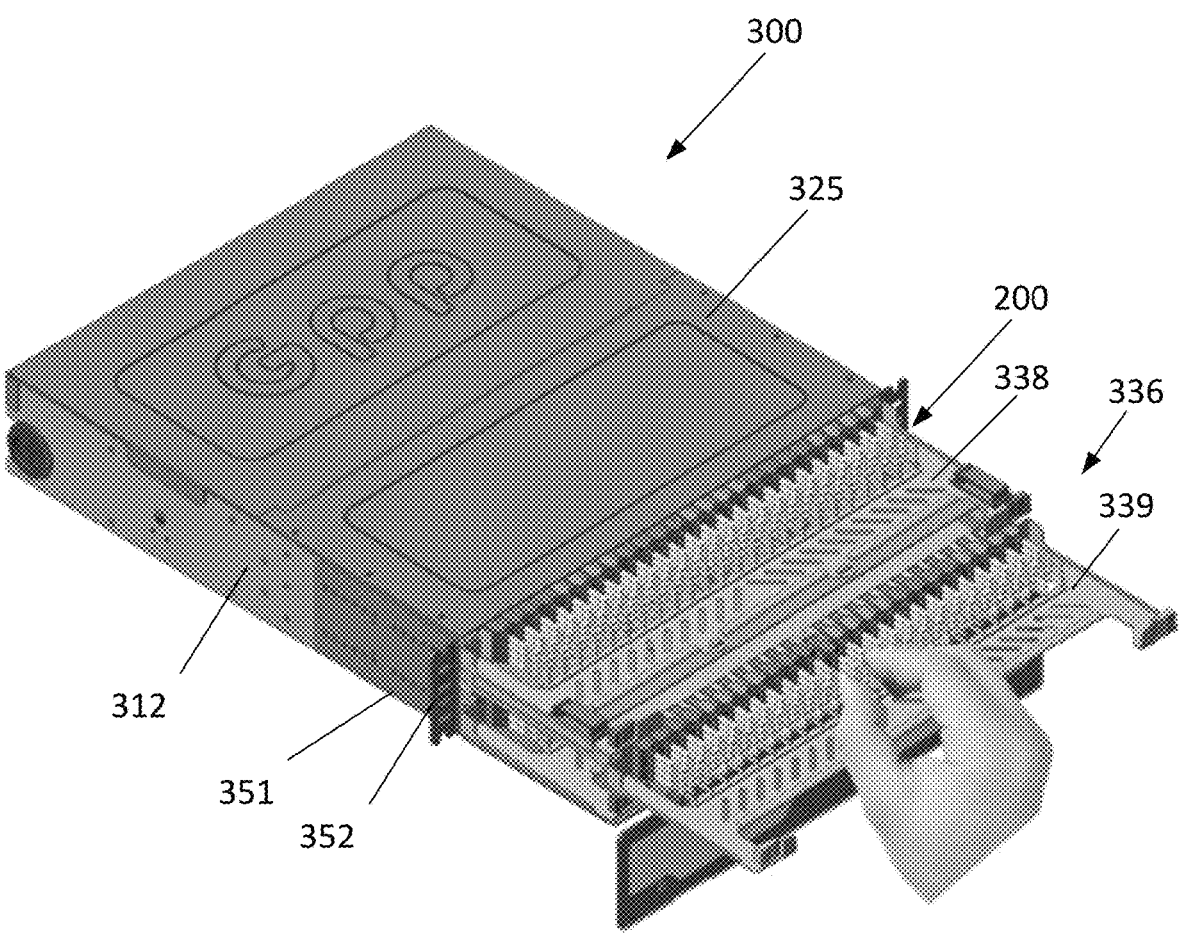
FIG. 3 depicts an example fiber optic panel assembly that may have a plurality of fiber optic adaptors mounted therein according to aspects of the disclosure.

FIG. 2 depicts an example of a fiber optic adaptor 200 that may be disposed in a fiber optic panel assembly 350, as further depicted in FIG. 3. It should be understood that the number of adapters and/or adaptor ports depicted in FIG. 2 is just an example and may be varied for different requirements and configurations. It is noted that multiple fiber optic adaptors 200 may be connected side by side, end to end, in multiple arrays or columns, or any suitable configurations as needed. In the example depicted in FIG. 2, the two fiber optic connectors 100a, 100b with different polarity configurations are connected to the fiber optic adaptor 200. The fiber optic adaptor 200 is configured to receive fiber optic connectors 100 with different polarities. For example, the two fiber optic connectors 100 with different polarity, such as the first fiber optic connector 100*a* with the latch 106 positioned upward from the housing and the second fiber optic connector 100*b* with the latch 106 positioned downward from the housing (not shown in FIG. 2), may be both engaged in the fiber optic adaptor 200 at the same time. It is noted the fiber optic adaptor 200 is a slidable adaptor that may be slid relative to a mounting support where the fiber optic adaptor 200 is mounted to. Details regarding the structures and configurations of the slidable fiber optic adaptor will be described in greater detail below.

FIG. 3 depicts an example of a front view of a plurality of the slidable fiber optic adaptor 200 placed in a fiber optic panel assembly 300 with a ceiling cover 325 installed and covered thereon. The plurality of slidable fiber optic adaptor 200 may be disposed in an interior region defined in the fiber optic panel assembly 300. The fiber optic adaptor 200 is disposed vertically in the interior region relative to a horizonal plane defined by the ceiling cover 325 or a bottom cover 351 of the fiber optic panel assembly 300. A mounting structure 352 may be disposed on side panels 312 that can assist mounting the fiber optic panel assembly 300 to a cable management system, such as a cable rack located in the server room or a data center.

Figure 4:
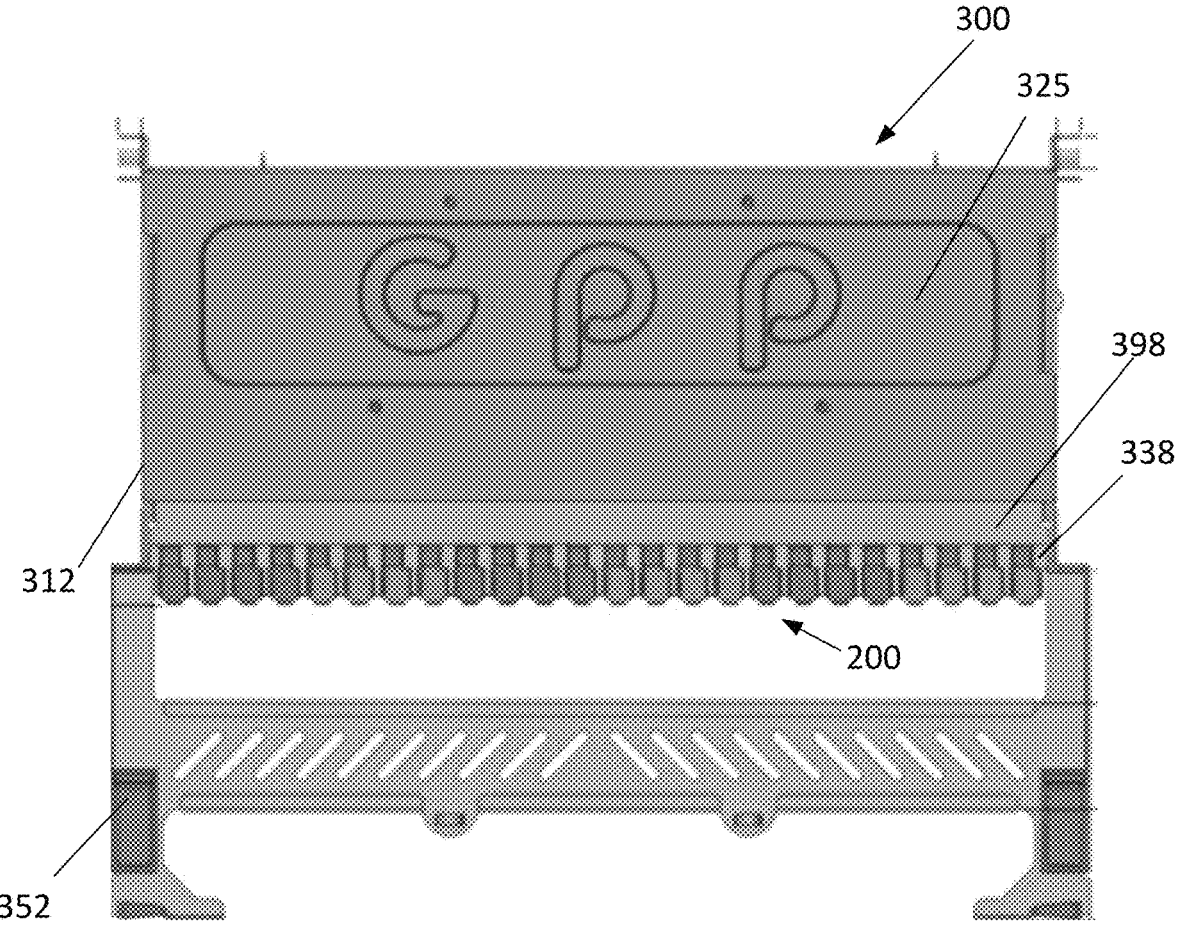
FIG. 4 depicts a top view of the fiber optic panel assembly of FIG. 3 that may have a plurality of slidable fiber optic adaptors mounted therein according to aspects of the disclosure.

A sliding tray 336 may be mounted in the fiber optic panel assembly 300. The sliding tray 336 may be configured such that it is extendable relative to the side panels 312 from the fiber optic panel assembly 300. The sliding tray 336 may carry multiple arrays of slidable fiber optic adaptors 200 disposed in mounting support 398, as shown in FIG. 4, so as to slide or pull a predetermined adaptors 200 outwardly from the ceiling cover 325 of the fiber optic panel assembly 300. In the example depicted in FIG. 3, the fiber optic panel assembly 300 has a second tray 339 in an extended position, such as a pulled-out position, relative to the first tray 338. It is noted that the number of the trays in the fiber optic panel assembly 300 may be varied, for example, based on dimensions, requirements, and configurations of the fiber optic panel assembly 300.

FIG. 4 depicts a top view of the fiber optic panel assembly 300 with a plurality of slidable fiber optic adaptors 200 disposed therein. The plurality of slidable fiber optic adaptors 200 may be disposed in the fiber optic panel assembly 300 through a mounting support 398 assembled in the fiber optic panel assembly 300. The mounting support 398 may be mounted to the sliding trays 336 as depicted in FIG. 3. The mounting support 398 may be removable from the fiber optic panel assembly 300 along with the slidable fiber optic adaptors 200 or independently from the slidable fiber optic adaptors 200. The mounting support 398 may be selected to have a structure that can allow and accommodate the sliding movement from the slidable fiber optic adaptors 200 relative to the mounting support 398. In one example, the mounting support 398 may have a plurality of ports, such as apertures, formed in a support plate, wherein the ports allow the slidable fiber optic adaptors 200 to be inserted therein. The mounting support 398 may be mounted to the side panels 312 to mount the mounting support 398 in the fiber optic panel assembly 300. Details of the slidable fiber optic adaptors 200 will be further described below.

Figures 5A, 5B:
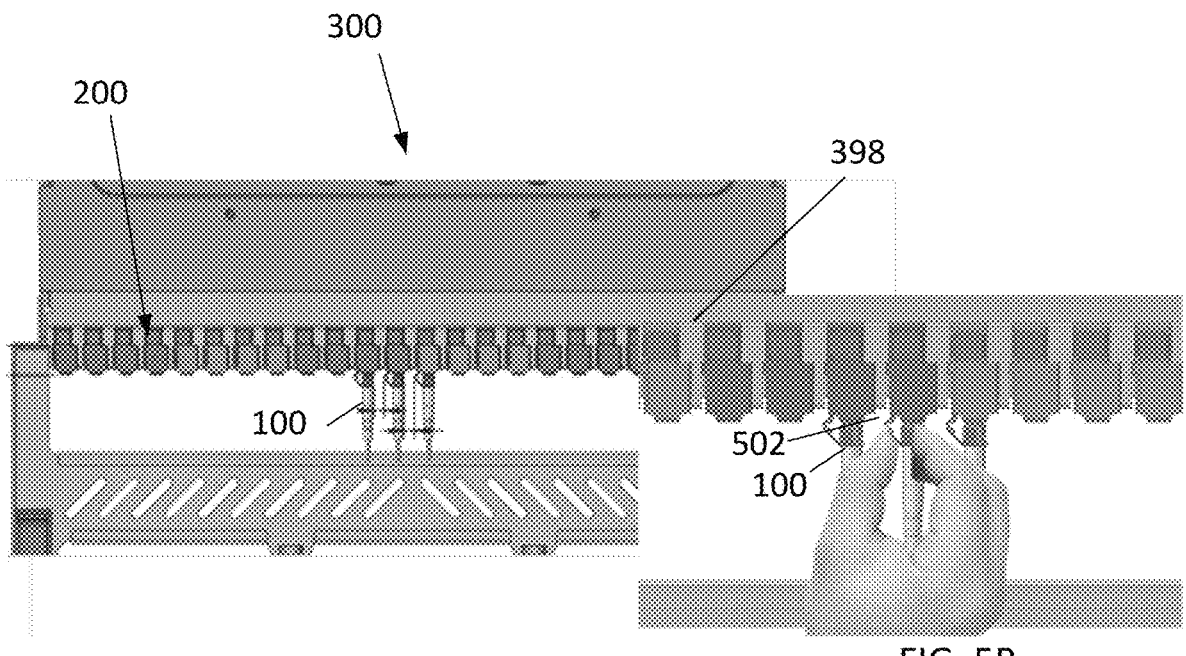
FIGS. 5A-5B depict a top view and an enlarged top view, respectively, of the fiber optic panel assembly of FIG. 3 having multiple fiber optic connectors coupled to the fiber optic slidable adaptors according to aspects of the disclosure.

FIG. 5A depicts a top view of the fiber optic panel assembly 300 with the plurality of slidable fiber optic adaptors 200 disposed therein. In the example depicted in FIG. 5A, three fiber optic connectors 100 are shown and coupled to the slidable fiber optic adaptors 200. As shown in the magnified view of FIG. 5B, as the fiber optic connectors

100 are coupled to the slidable fiber optic adaptors 200 with the same polarity, the space 502 defined between fiber optic connectors 100 is sufficiently wide enough to allow finger access from the operator.

Figure 6:
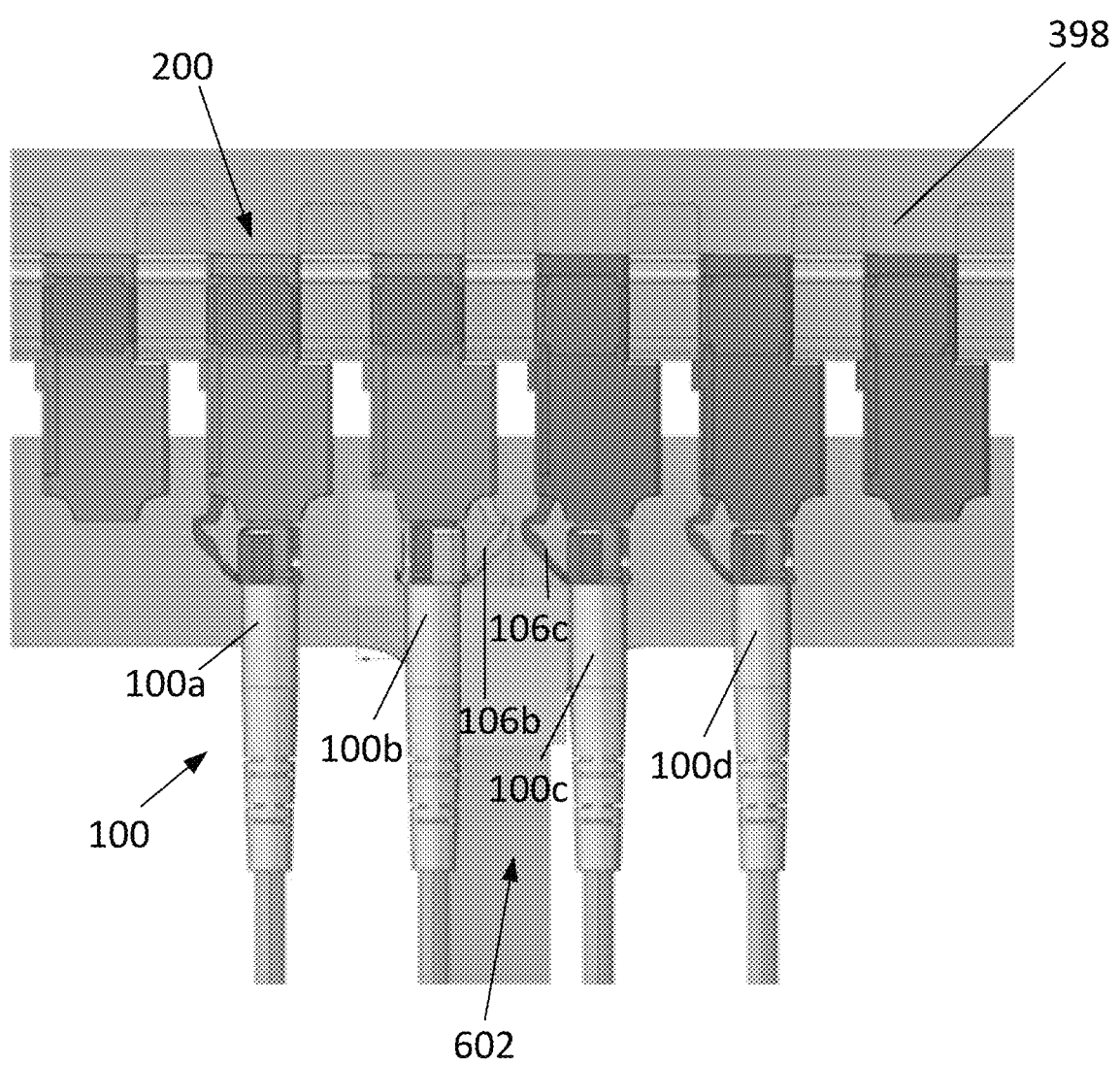
FIG. 6 depicts a top view of the fiber optic panel assembly of FIG. 3 with cramped spaces among fiber optic connectors with different polarities coupled to the slidable adaptors in a non-extended position according to aspects of the disclosure.

In contrast, in the example depicted in FIG. 6 wherein the fiber optic connectors 100, as shown as 100*a-d*, coupled to the slidable fiber optic adaptors 200 are configured to have different polarities, the space 602 defined between the fiber optic connectors 100*b*, 100*c* may be cramped that creates interference and results in difficult finger access. For example, in the example depicted in FIG. 6, a first fiber optic connector 100*b* is disposed in the slidable fiber optic adaptor 200 with a first polarity, such as the latch 106*b* of the optic connector 100*b* configured at a right side relative to the body of the first fiber optic connector 100*b*, while a second fiber optic connector 100*c* is disposed in the slidable fiber optic adaptor 200 with a second polarity, such as the latch 106*c* of the optic connector 100*c* configured at a left side relative to the body of the second fiber optic connector 100*c*. Thus, the space 602 defined between the latches 106*b*, 106*c* of the first and the second fiber optic connectors 100*b*, 100*c* is relatively narrower and cramped, which results in difficult finger access.

Figure 7:
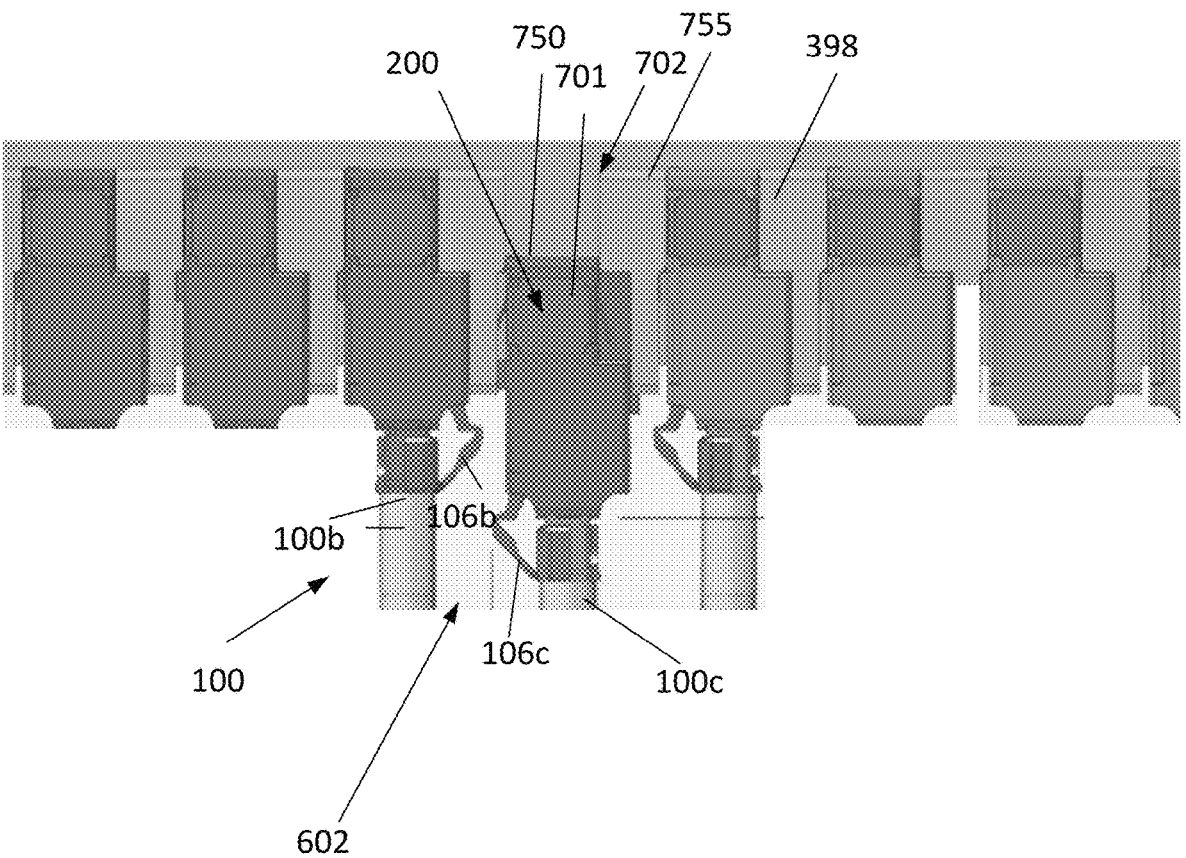
FIG. 7 depicts a top view of the fiber optic panel assembly of FIG. 3 having one of the fiber optic adaptors in an extended position according to aspects of the disclosure.
Figure 8:
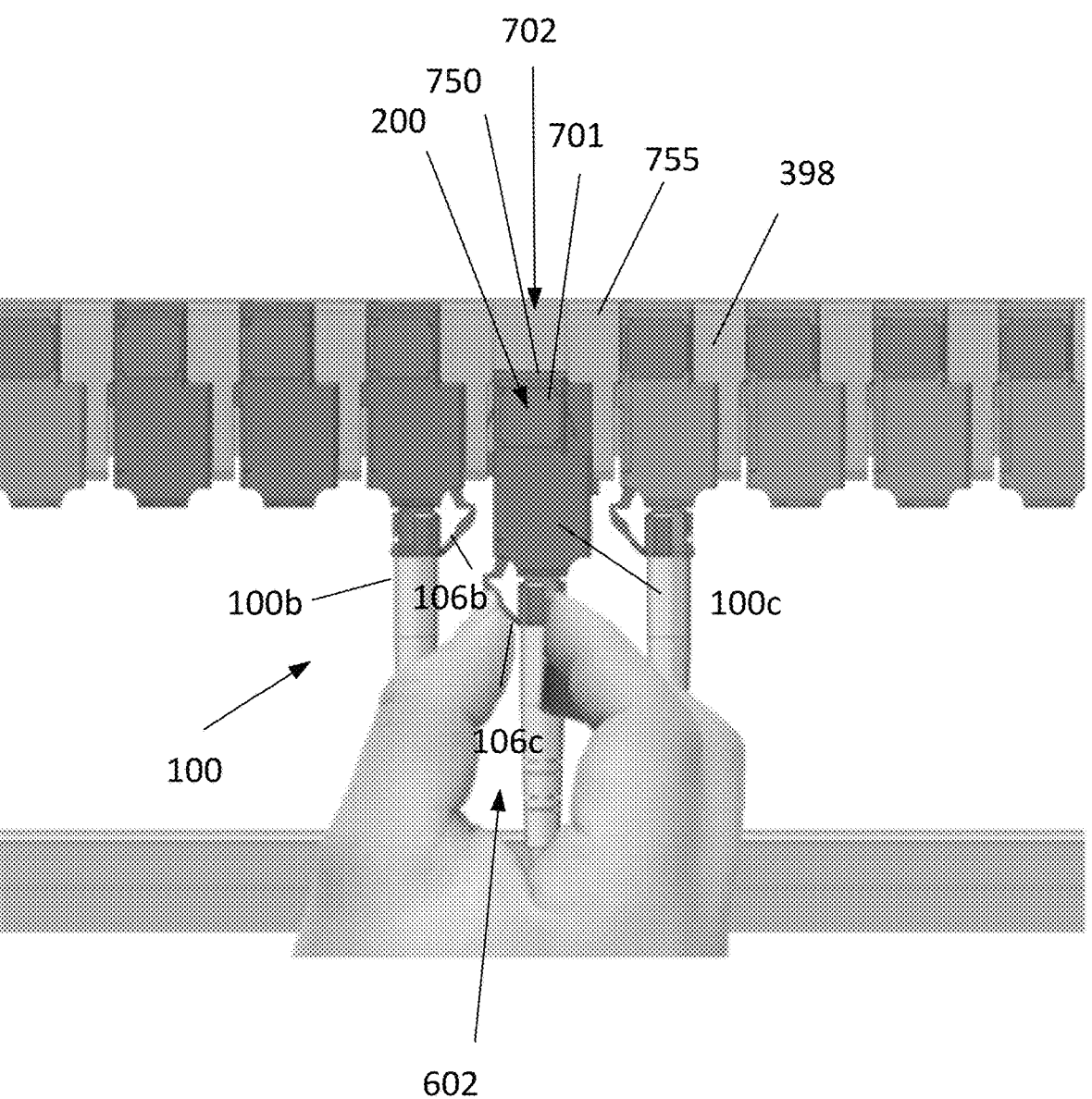
FIG. 8 depicts a top view of the fiber optic panel assembly of FIG. 3 having one of the slidable adaptors in an extended position for finger access according to aspects of the disclosure.

FIG. 7 depicts an example of the slidable fiber optic adaptor 200 being pulled out in an extended position. As described above, the cramped space 602 defined between latches 106*b*, 106*c* of the first and the second fiber optic connectors 100*b*, 100*c* may result in difficult finger access. Thus, the slidable fiber optic adaptor 200 may utilize a sliding feature 701 disposed in the slidable fiber optic adaptor 200, such that it may be selectively and individually pulled out to the extended position, relative to the mounting support 398. In the extended position, the latches 106*b*, 106*c* of the fiber optic connector 100*b*, 100*c* are configured in a staggered configuration. Accordingly, the latch 106*b* of the first fiber optic connector 100*b* may be temporarily displaced out of a horizontal plane that include neighboring fiber optic connector 100*c* and other fiber optic connectors in the panel assembly, thus allowing sufficient space for finger access, as shown in FIG. 8. Thus, the slidable fiber optic adaptor 200 may be selectively and/or independently slidable between a non-extended position and an extended position to facilitate providing sufficient space between the fiber optic connectors 100*b*, 100*c* when different polarities of the fiber optic connectors 100*b*, 100*c* are utilized and configured. Referring back to FIG. 7, when the slidable fiber optic adaptor 200 is pulled outward, an end 750, such as a front surface, of the slidable fiber optic adaptor 200 may be caved in the mounting support 398, such that the end 750 is shifted distally relative to an inner surface 755 defined by the mounting support 398. Thus, an aperture 702 is formed when the slidable fiber optic adaptor 200 is pulled outward in the extended position. When the slidable fiber optic adaptor 200 is pushed back to the non-extended position, the end 750 of the slidable fiber optic adaptor 200 is then reset to a default position to be coplanar with the inner surface 755 of the mounting support 398.

Figure 9A:
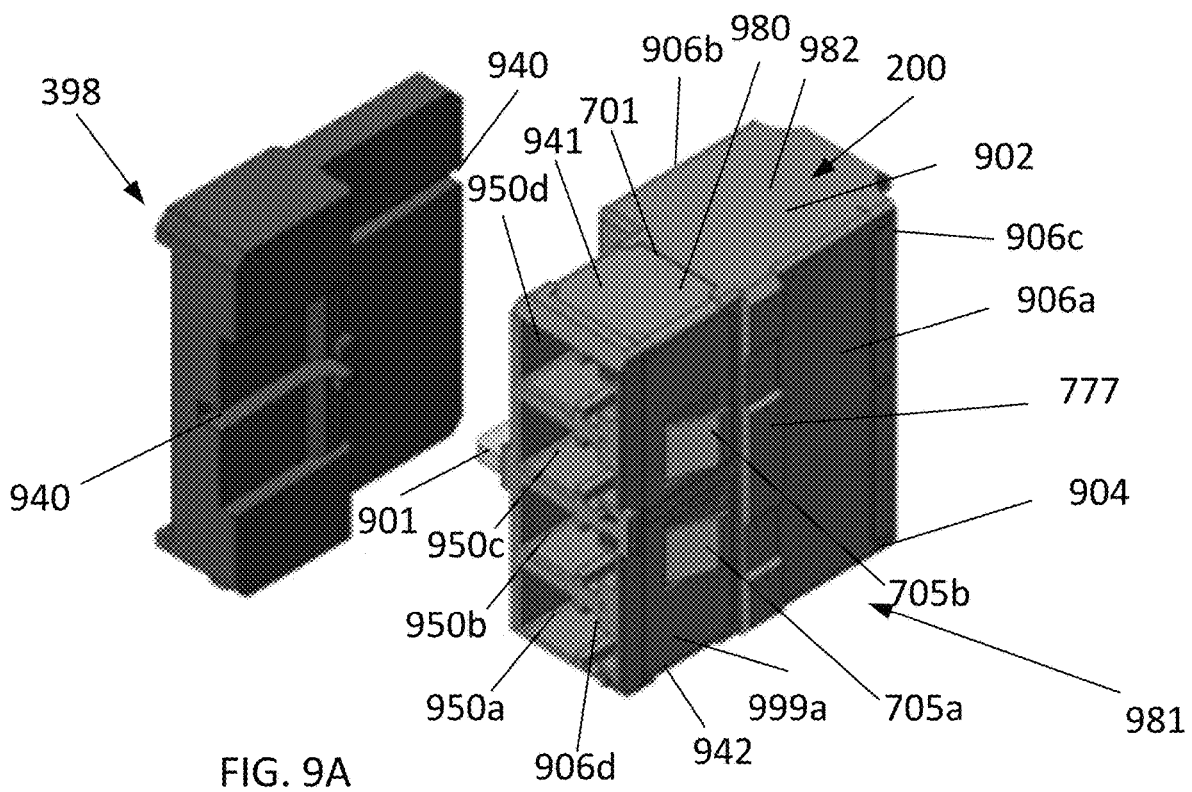
FIGS. 9A-9B depict perspective views of the fiber optic adaptors according to aspects of the disclosure.
Figure 9B:
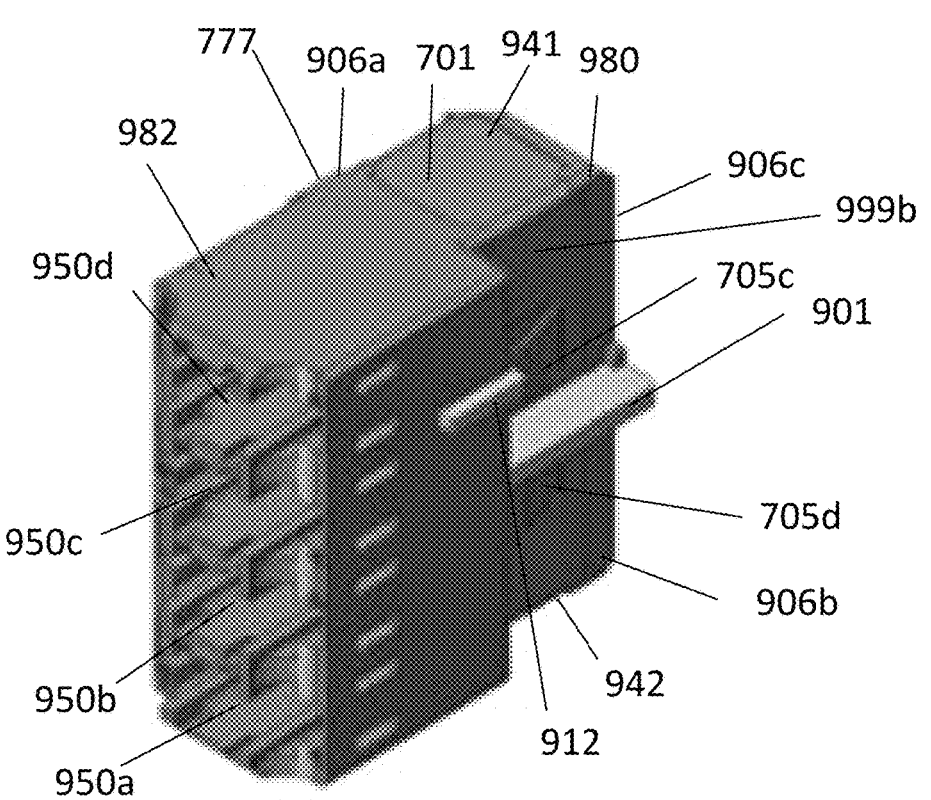

FIGS. 9A-9B depict front and back side views of the slidable fiber optic adaptor 200. In this example, the fiber optic adaptor 200 may a housing 981 having a top surface 902, a bottom surface 904 and sidewalls 906*a-906d* defining an interior region in the slidable fiber optic adaptor 200. Four connecting ports 950*a-950d* are defined in the fiber optic adaptor 200 that may be configured to receive a respective fiber optic connector 100. The number of the connecting ports 950*a-950d* defined in the slidable fiber optic adaptor 200 may be varied and in any number. The connecting ports 950a-950d may be configured to receive fiber optic connectors 100 with different polarities, such as dual polarity fiber optic connectors depicted in FIGS. 1A-C.

The slidable fiber optic adaptor 200 may include a first portion 980 connecting with a second portion 982. For example, as shown, the first portion 980 is an extension of the second portion 982 and has a relatively smaller width than the second portion 982. A plurality of engagement features 777 may be formed on the second portion 982 configured to mate with the mounting support 398 when installed. The second portion 982 has the four connecting ports 950a-950d defined therein configured to receive a respective fiber optic connector 100. The sliding feature 701 is disposed on the first portion 980 of the slidable fiber optic adaptor 200. The sliding feature 701 may be, for example, a plate, sheath, or other structure disposed on or integrated with the first portion 980. The sliding feature may be made from, for example, metal, plastic, or any other material. In the example depicted in FIGS. 9A-9B, the sliding feature 701 is in the form of a rectangular ring configured to circumscribe, completely or partially, an outer surface of the first portion 980 of the slidable fiber optic adaptor 200. The sliding feature 701 may be fastened on the first portion 980 of the slidable fiber optic adaptor 200 in any suitable manner, such as molding, clamping, adhering, soldering, or the like. It is noted that the sliding feature 701 may be in any configuration and integrated with or coupled to the first portion 980 of the slidable fiber optic adaptor 200. For examples, the sliding feature 701 may be a U-shape configuration, or segmental structures or the like to facilitate the sliding movement of the slidable fiber optic adaptor 200 relative to the mounting support 398.

In one example, the sliding feature 701 may have a top surface 941 and a bottom surface 942 connected by the sidewalls 999a, 999b. Each sidewall 990a, 990b is configured to have one or more sloped plates 705a-705b, 705c-705d, configured to be engaged with the mounting support 398 when installed therein. In one example, each sidewall 990a, 990b is configured to have a pair of sloped plates 705a-705b, 705c-705d formed therein. The sloped plate 705a-705d has a sloped surface having an angle relative to a plane defined by the sidewalls 990a, 990b of the sliding feature 701. The sloped plate 705a-705d may provide a sliding interface to be engaged or disengaged with the mounting support 398 when actuated or pulled/pushed at different positions. A first securing rod 901 may be formed on the sidewall 999b of the sliding feature 701 on the first portion 980. The first securing rod 901 may be engaged in a first channel 940 defined in a portion of the mounting support 398. A second securing rod 912 may be formed on the sidewall of the second portion 982. The securing rod 902 may be engaged in a second channel 942 defined in a portion of the mounting support 398.

In one example, the sliding feature 701 may be in any suitable or proper form to provide a sliding movement of the slidable fiber optic adaptor 200 relative to the mounting support 398. The sloped plates 705a-705b, 705c-705d formed in the sliding feature 701 may be compressed from an expanded state to a compressed state and released back to the expanded state when performing the sliding movement of the slidable fiber optic adaptor 200 relative to the mounting support 398. The expansion and compression of the sloped plates 705a-705b, 705c-705d may facilitate the sliding feature 701 being pushed and pulled between a first position and a second position, such as the extended position and the non-extended position, relative to the mounting support 398. As the first portion 980 of the slidable fiber optic adaptor 200 is sized to mate with the ports defined in the mounting support 398 for mounting, the sliding feature 701 is also sized to fit with the dimension of the first portion 980 of the slidable fiber optic adaptor 200 as well as the ports defined in the mounting support 398 configured to receive the slidable fiber optic adaptor 200.

Figure 9C:
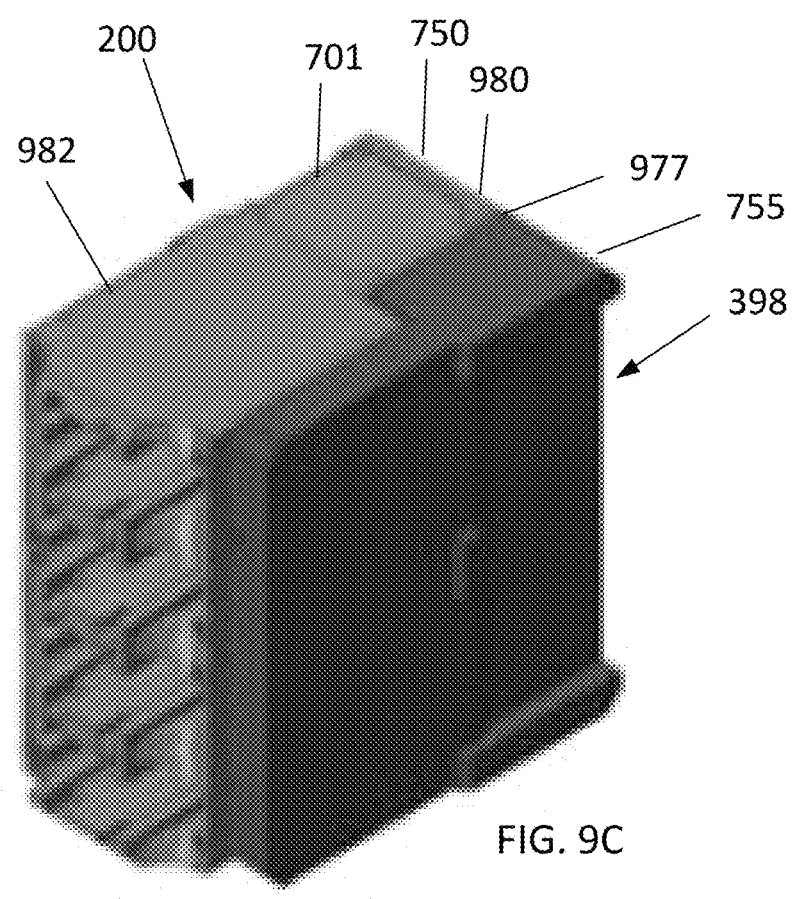
FIGS. 9C-9D depict perspective views of the slidable fiber optic adaptor in a non-extended position and in an extended position relatively to a mounting support configured to be mounted to a fiber optic panel assembly according to aspects of the disclosure.
Figure 9D:
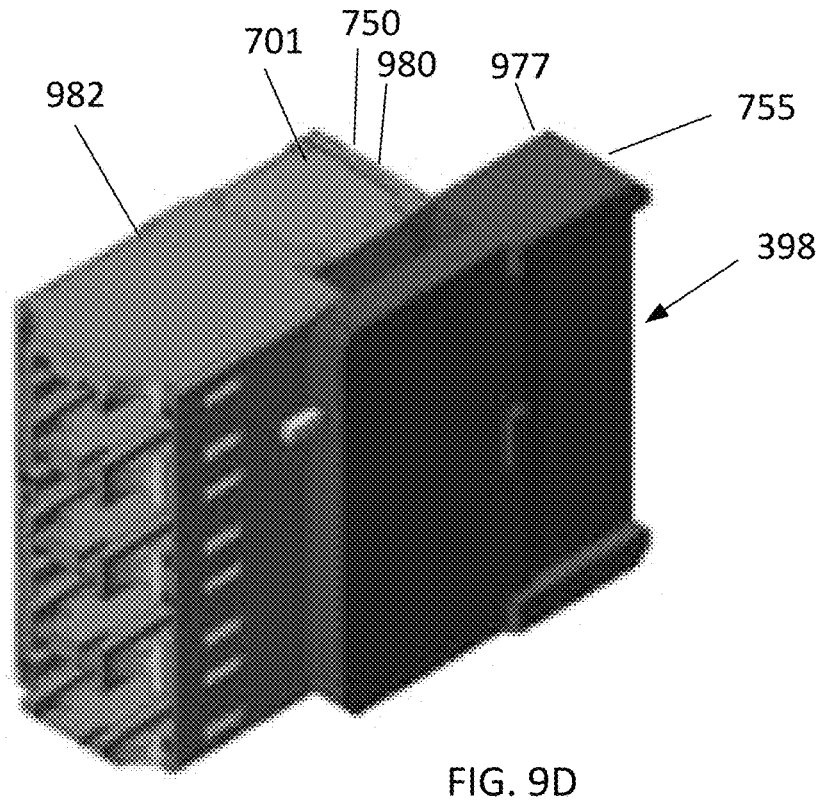

FIG. 9C-9D depict examples of the slidable fiber optic adaptor 200 installed and engaged with the mounting support 398 in a non-extended position and an extended position. When the slidable fiber optic adaptor 200 is in the non-extended position as shown in FIG. 9C, the first portion 980 and the second portion 982 of the slidable fiber optic adaptor 200 are configured to be mated with a sidewall 977 of the mounting support 398 and the end 750 of the slidable fiber optic adaptor 200 is coplanar with an inner surface 755 of the mounting support 398. In contrast, when the slidable fiber optic adaptor 200 is in the extended position as shown in FIG. 9D, the first portion 980 and the second portion 982 of the slidable fiber optic adaptor 200 are pulled to be caved in so that the end 750 of the slidable fiber optic adaptor 200 is relatively inward from the inner surface 755 of the mounting support 398. The sidewall 977 of the mounting support 398 is exposed to define the aperture 702, as shown in FIG. 7, when the slidable fiber optic adaptor 200 is in the extended position.

Figures 10A, 10B:
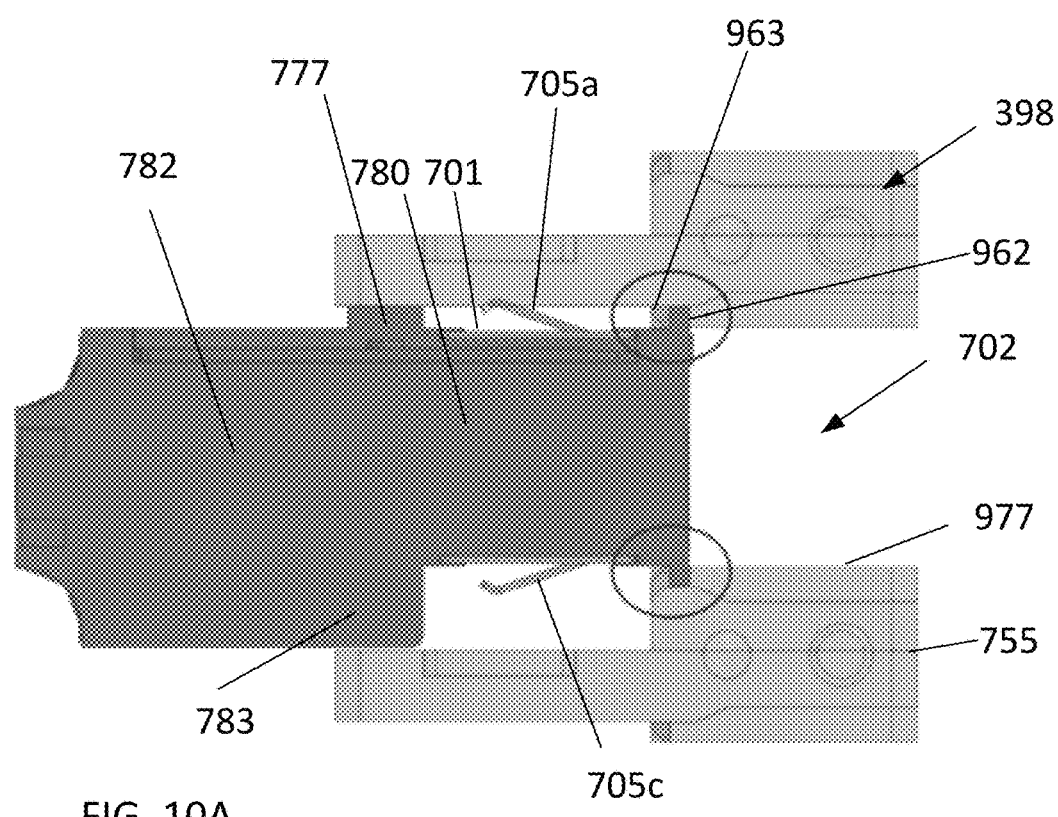
FIGS. 10A-10B depict top views of the slidable fiber optic adaptor in a non-extended position and in an extended position relatively to a mounting support configured to be mounted to a fiber optic panel assembly according to aspects of the disclosure.

FIG. 10A-10B depicts a top view of the slidable fiber optic adaptor 200 mounted in the mounting support 398 in the extended position and in the non-extended position respectively. In the example depicted in FIG. 10A, the slidable fiber optic adaptor 200 is pulled out in an extended position with an adaptor stopper 962 engaged with a post 963 defined in the mounting support 398. The post 963 defined in the mounting support 398 may prevent the slidable fiber optic adaptor 200 from further being pulled out, thus limiting the movement of the slidable fiber optic adaptor 200 relative to the mounting support 398 at a predetermined distance, such as the dimension of the aperture 702 defined therein. The pair of sloped plates 950a, 950c is maintained in an expanded state and stored in a compartment defined between the post 963 and the engagement features 777 or a side portion 783 of the second portion 782 of the slidable fiber optic adaptor 200.

In contrast, when the slidable fiber optic adaptor 200 is pushed back to the non-extended position, as shown in FIG. 10B, the pair of sloped plates 950a, 950c may be compressed by the post 963 of the mounting support 398, going through from an expanded to a compressed state to pass through the post 963. Once the pair of sloped plates 950a, 950c pass through the post 963 of the mounting support 398, the sloped plates 950a, 950c may return back to the expanded state to engage with a sidewall and/or the post 963 of the mounting support 398, thus securing the slidable fiber optic adaptor 200 in the predetermined position with the end 750 of the slidable fiber optic adaptor 200 coplanar with the inner surface 755 of the mounting support 398.

Figures 11A, 11B:
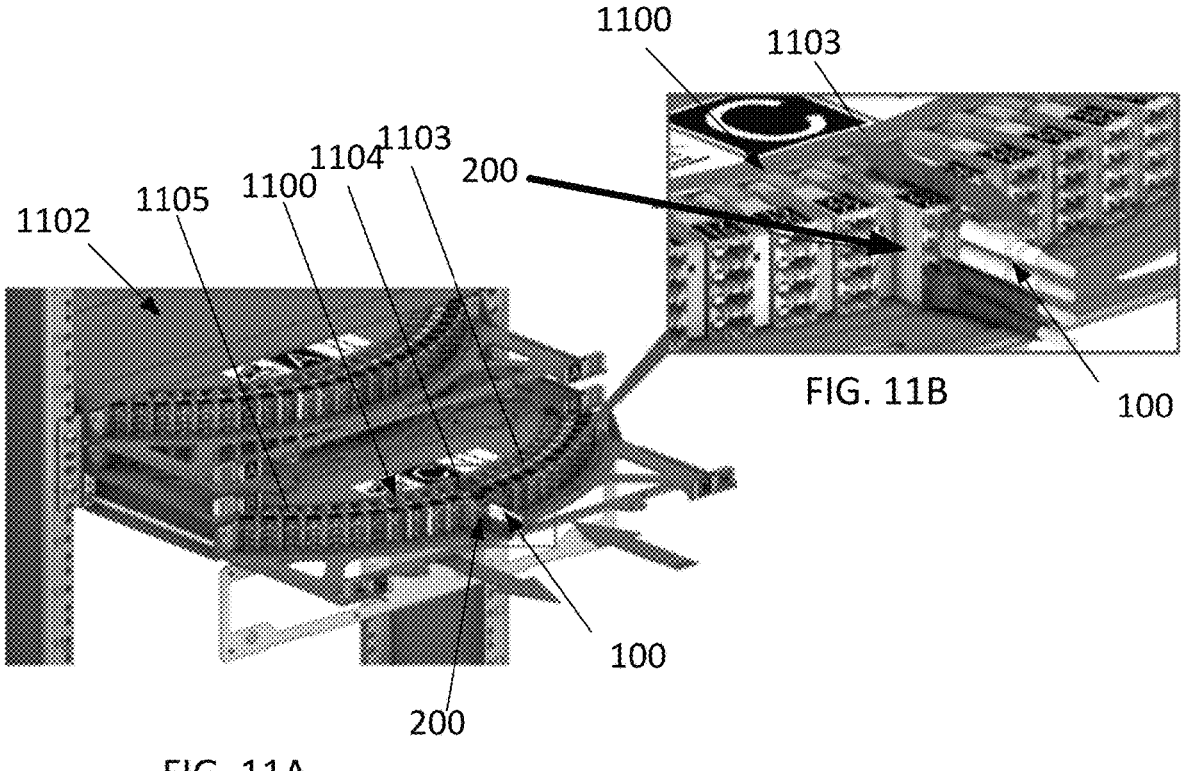
FIGS. 11A-11B depict an example of a curved support plate that may be disposed in a fiber optic panel assembly according to aspects of the disclosure.

FIG. 11A depicts a schematic view of a curved support plate 1100 disposed in a patch panel assembly 1102. The curved support plate 1100 may be configured to receive slidable fiber optic adaptor 200, similar to the adaptors 200 depicted above, to receive fiber optic connectors, such as the fiber optic connectors 100 depicted in FIG. 1. The curved support plate 1100 includes a plate body 1103 having a center portion 1104 and two edge portions 1105 formed at two ends of the plate body 1103. A front surface in the center portion 1104 protrudes outwardly toward to form the curved plate 1100. The plate body 1103 has a curved configuration having the front surface defining a concave surface and the rear surface defining a convex surface. The curvature of the plate body 1103 is selected so that the fiber optic connectors 100 disposed in the slidable fiber optic adaptor 200 in the curved support plate 1100 may have a desired spaced-apart relationship that allows finger access in the space between the fiber optic connectors 100. FIG. 11B depicts a magnified view of the curved support plate 1102. The slidable fiber optic adaptor 200 disposed in the curved support plate 1100 allows a horizonal movement of the slidable fiber optic adaptor 200 to be slidable relative to the curved support plate 1100 so as to provide a wider space among each slidable fiber optic adaptor 200 vertically disposed side by side abut each other.

Thus, a slidable fiber optic adaptor slidable relative to a mounting support configured to be mounted to a fiber optic tray in a panel assembly is provided for fiber optic interconnection. The slidable adaptor may be slidable between a non-extended position and an extended position. Thus, when the fiber optic connectors having different polarities are connected to the slidable adaptors, the slidable fiber optic adaptor may be pulled out in the extended position to allow the fiber optic connectors with different polarities to be in a staggered configuration, thus, providing sufficient space therebetween for finger access for operators or technicians. Thus, the slidable adaptor may receive and accommodate fiber optic connectors with different polarities while maintaining sufficient space among the fiber optic connectors for inspection and connection management. The slidable fiber optic adaptor has a sliding feature configured to provide movement of the slidable fiber optic adaptor between the non-extended position and the extended position relative to the mounting support when sufficient space is needed between the fiber optic connectors disposed therein. Thus, the individually slidable fiber optic adaptor may provide easy management and access of a target fiber optic connector coupled to a panel assembly for cable inspection and management.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible implementations. Further, the same reference numbers in different drawings can identify the same or similar elements.

The invention claimed is:

1. A fiber optic adaptor, comprising:
   a housing including a first portion and a second portion, wherein the first portion extends from the second portion;
   a plurality of connecting ports defined in the second portion of the housing, the connecting ports configured to receive connectors inserted in a first direction into the connecting ports; and
   a sliding feature extending along at least a first side surface of the first portion and a second side surface of the first portion opposite the first side surface, wherein the sliding feature is configured to allow a sliding movement of the fiber optic adapter along an internal surface of a mounting support in a direction opposite the first direction.

2. The fiber optic adaptor of claim 1, wherein the sliding feature is a rectangular ring at least partially circumscribing an outer perimeter of the first portion.

3. The fiber optic adaptor of claim 1, wherein the mounting support is configured to be mounted to a fiber optic panel assembly for fiber cable connection.

4. The fiber optic adaptor of claim 1, wherein the sliding feature comprises:
   sidewalls extending along opposing sides of the sliding feature; and
   one or more sloped plates formed on each sidewall of the sliding feature.

5. The fiber optic adaptor of claim 4, further comprising:
   a first securing rod formed on one of the sidewalls of the sliding feature.

6. The fiber optic adaptor of claim 1, further comprising:
   a stopper formed at an end surface of the first portion of the fiber optic adaptor.

7. The fiber optic adaptor of claim 6, wherein the stopper is configured to be engaged with a post of a mounting support when the fiber optic adaptor is coupled to the mounting support and pulled in an extended position.

8. The fiber optic adaptor of claim 7, further comprising:
   a plurality of engagement features formed on the second portion of the fiber optic adaptor, the engagement features configured to engage with the post of the mounting support when the fiber optic adaptor is coupled to the mounting support and maintained in a non-extended position.

9. The fiber optic adaptor of claim 1, wherein the connecting ports are configured to receive dual polarity fiber optic connectors.

10. A fiber optic panel assembly, comprising:
    a mounting support disposed in a slidable tray disposed in a fiber optic panel assembly; and
    a slidable fiber optic adaptor disposed in the mounting support, wherein the slidable fiber optic adaptor is slidable relative to the mounting support between an extended position and a non-extended position.

11. The fiber optic panel assembly of claim 10, wherein the fiber optic adaptor comprises:
    a housing including a first portion connected to a second portion;
    a plurality of connecting ports defined in the second portion of the housing; and
    a sliding feature disposed around a perimeter of the first portion.

12. The fiber optic panel assembly of claim 11, wherein the connecting ports are configured to receive dual polarity fiber optic connectors.

13. The fiber optic panel assembly of claim 10, wherein the slidable fiber optic adaptor has an end substantially coplanar with an inner surface of the mounting support when the slidable fiber optic adaptor is in the non-extended position.

14. The fiber optic panel assembly of claim 10, wherein the slidable fiber optic adaptor has an end caved inward from an inner surface of the mounting support when the slidable fiber optic adaptor is in the extended position.

15. The fiber optic panel assembly of claim 10, wherein the slidable fiber optic adaptor has a stopper configured to engage with a post of the mounting support when the slidable fiber optic adaptor is in the extended position.

16. The fiber optic panel assembly of claim 15, wherein the slidable fiber optic adaptor has a plurality of engagement features configured to engage with the post of the mounting support when the slidable fiber optic adaptor is in the non-extended position.

17. The fiber optic panel assembly of claim 10, wherein the slidable fiber optic adaptor has one or more sloped plates formed on sidewalls of the slidable fiber optic adaptor, the sloped plates configured to go through from a compressed state to an expanded state when switching from the non-extended position to the extended position.

18. The fiber optic panel assembly of claim 10, further comprising:

a securing rod formed on a sidewall of the slidable fiber optic adaptor configured to engage with a channel formed in the mounting support.

19. A fiber optic panel assembly, comprising:

a ceiling cover, a bottom cover, and two opposing side panels defining an interior opening therein; and a plurality of slidable fiber optic adaptors disposed in a mounting support disposed in the fiber optic panel assembly, wherein each of the slidable fiber optic adaptors is individually slidable between an extended position and a non-extended position.

* * * * *